(12) United States Patent
Stacy, II

(10) Patent No.: US 10,732,646 B2
(45) Date of Patent: Aug. 4, 2020

(54) DYNAMIC JACK REFERENCE CONTROL SYSTEM AND METHOD FOR EXTENDING VEHICLE JACKS

(71) Applicant: Flanders Electric Motor Service, Inc., Evansville, IN (US)

(72) Inventor: Edward Curtis Stacy, II, Kearny, AZ (US)

(*) Notice: Subject to any disclaimer, the term of this patent is extended or adjusted under 35 U.S.C. 154(b) by 147 days.

(21) Appl. No.: 16/131,466

(22) Filed: Sep. 14, 2018

(65) Prior Publication Data

US 2019/0011933 A1 Jan. 10, 2019

Related U.S. Application Data

(60) Division of application No. 15/056,451, filed on Feb. 29, 2016, now Pat. No. 10,114,383, which is a continuation of application No. 12/616,380, filed on Nov. 11, 2009, now Pat. No. 9,284,167.

(51) Int. Cl.
| | |
|---|---|
| *G05D 1/08* | (2006.01) |
| *B66C 23/18* | (2006.01) |
| *B66C 23/78* | (2006.01) |
| *B66C 23/80* | (2006.01) |
| *B60S 9/02* | (2006.01) |
| *E02F 9/08* | (2006.01) |
| *E21B 7/02* | (2006.01) |

(52) U.S. Cl.
CPC ............ *G05D 1/0891* (2013.01); *B60S 9/02* (2013.01); *B66C 23/18* (2013.01); *B66C 23/78* (2013.01); *B66C 23/80* (2013.01); *E02F 9/085* (2013.01); *E21B 7/024* (2013.01)

(58) Field of Classification Search
CPC ........................................................ B60S 9/02
See application file for complete search history.

(56) References Cited

U.S. PATENT DOCUMENTS

| 5,143,386 A | * | 9/1992 | Uriarte ..................... B60S 9/02 180/41 |
| 2003/0135312 A1 | * | 7/2003 | Ford ........................ B60S 9/02 701/36 |
| 2004/0046337 A1 | * | 3/2004 | Sproatt .................... B60S 9/12 280/6.156 |

* cited by examiner

*Primary Examiner* — Imran K Mustafa
(74) *Attorney, Agent, or Firm* — Martin IP Law Group; C. Richard Martin

(57) ABSTRACT

A method for leveling a jacked vehicle may involve: (a) sensing a pitch angle of the vehicle; (b) sensing a roll angle of the vehicle; (c) producing a pitch reference value that is related to the sensed pitch angle of the vehicle; (d) producing a roll reference value that is related to the sensed roll angle of the vehicle; (e) extending a vehicle jack that affects at least the pitch angle of the vehicle at a speed that is related to the pitch reference value; (f) extending a vehicle jack that affects at least the roll angle of the vehicle at a speed that is related to the roll reference value; and (g) repeating (a)-(f) until the sum of the pitch and roll angles falls below a predetermined angle.

15 Claims, 7 Drawing Sheets

DYNAMIC JACK REFERENCE CONTROL SYSTEM AND METHOD FOR EXTENDING VEHICLE JACKS

CROSS-REFERENCE TO RELATED APPLICATIONS

This invention is a divisional of pending U.S. patent application Ser. No. 15/056,451 which is a continuation of U.S. Pat. No. 9,284,167, both of which are hereby incorporated herein by reference for all that they disclose.

FIELD OF THE INVENTION

This invention relates to vehicles having stabilizing jacks in general and more specifically to methods and systems for extending the jacks.

BACKGROUND OF THE INVENTION

Numerous kinds of vehicles having retractable jacks for stabilization and/or lifting are known in the art and are used in a wide range of applications. Typically, the stabilizing jacks are hydraulically operated and are moveable between retracted and extended positions. When in the retracted position, the stabilizing jacks are out of the way and allow the vehicle to move about without interference from the jacks. When in the extended position, the stabilizing jacks contact the ground and support at least a portion, if not the entirety, of the vehicle. In certain applications, the jacks may be used merely to stabilize the vehicle, whereas in other applications, the jacks my lift all or a portion of the vehicle to level the vehicle or otherwise position the vehicle in a desired attitude.

While such stabilizing jack systems may be manually controlled, many jack systems are partially- or fully-automated, and use a jack deployment system to automatically extend or deploy the jacks until they provide the desired degree of lift or stabilization. In such an application, the jack deployment system may utilize one or more tilt sensors to detect or sense the tilt angle or attitude of the vehicle. The jack deployment system extends the various vehicle jacks until the tilt sensors indicate that the vehicle has been leveled or has otherwise reached the desired attitude.

Unfortunately, however, such jack deployment systems are not without their drawbacks. For example, one problem that can arise relates to the sensitivity of the tilt sensors used to sense the attitude or tilt angle of the vehicle. If the sensors are too sensitive compared with the ability of the jack deployment system to position the vehicle within a certain tolerance, the system may have difficulty achieving the desired tilt or attitude set point. The system may "hunt" excessively in an attempt to achieve the attitude set point. While this problem can be overcome by re-calibrating the tilt sensors (i.e., to change the scaling factors), such re-calibration reduces the resolution of the sensors, thereby reducing the leveling accuracy of the system. Indeed, in systems involving such re-calibrated sensors, it is not unusual for the actual leveling accuracy to be many times lower than the design accuracy. For example, a system designed to level within 0.1 degree may actually only level to within 0.4 degree.

Another solution is to filter the output of the tilt sensor to smooth-out the signal. Unfortunately, however, such filtering may cause the jack deployment system to over- or under-shoot the desired attitude set point. If this occurs, the jack deployment system may repeatedly tilt the vehicle back and forth in an attempt to achieve the desired attitude set point. Besides increasing the amount of time required for the system to achieve the desired attitude, such back and forth vehicle motion can impose excessive stress on the vehicle. Even worse, if the system is not properly damped, there is a danger that the back and forth motion will cause the vehicle to enter a harmonic vibration state. Such harmonic vibrations are of particular concern if the vehicle is provided large, mast-like structures, such as a drill derrick.

In addition to the structural problems caused by such repeated back and forth vehicle motion, such motion can result in excessive settling of the vehicle on the supporting ground, which can further increase the difficulty in achieving the desired attitude set point. Indeed, in some cases the overall system hysteresis caused by jack settling can make it impossible for the jack deployment system to ever achieve the desired attitude set point.

Still other problems may stem from the particular speed at which the jacks are extended. For example, a fast jack extension speed increases the likelihood that the jack deployment system will overshoot the desired set point. As described above, such overshooting of the desire set point may lead to excessive back and forth vehicle motion, increased vehicle stress, the danger of inducing harmonic vibrations, and settling hysteresis, all of which are deleterious. Moreover, fast jack extension speeds may require rapid cycling of the jack actuators as the vehicle nears the desired attitude set point. Such rapid cycling can impose excessive stresses on the jacks and may also induce harmonic vibrations in the vehicle structure.

On the other hand, if the jack extension speed is too slow, the system may require an excessive period of time to achieve the desired attitude set point, particularly if the initial vehicle attitude departs significantly from the desired attitude set point. In addition, undershooting the desired set point may also result in undesirable back and forth vehicle motion as the jack extension system attempts to reach the desired attitude set point.

BRIEF SUMMARY OF THE INVENTION

A method for leveling a jacked vehicle according to one embodiment of the invention may involve: (a) sensing a pitch angle of the vehicle; (b) sensing a roll angle of the vehicle; (c) producing a pitch reference value that is related to the sensed pitch angle of the vehicle; (d) producing a roll reference value that is related to the sensed roll angle of the vehicle; (e) extending a vehicle jack that affects at least the pitch angle of the vehicle at a speed that is related to the pitch reference value; (f) extending a vehicle jack that affects at least the roll angle of the vehicle at a speed that is related to the roll reference value; and (g) repeating (a)-(f) until the sum of the pitch and roll angles falls below a predetermined angle.

BRIEF DESCRIPTION OF THE DRAWINGS

Illustrative and presently preferred exemplary embodiments of the invention are shown in the drawings in which.

DETAILED DESCRIPTION OF THE INVENTION

A dynamic jack reference control system 10 according to one embodiment of the present invention is shown and described herein as it may be utilized on a on a drill rig 12 of the type commonly used in mining and quarrying operations to drill blastholes (not shown). Alternatively, the system 10 may be used in any of a wide range of other applications and other vehicle types, as would become apparent to persons having ordinary skill in the art after having become familiar with the teachings provided herein. Consequently, the present invention should not be regarded as limited to the particular vehicle (e.g., drill rig 12) and application (e.g., blasthole drilling) shown and described herein.

Figure 1:
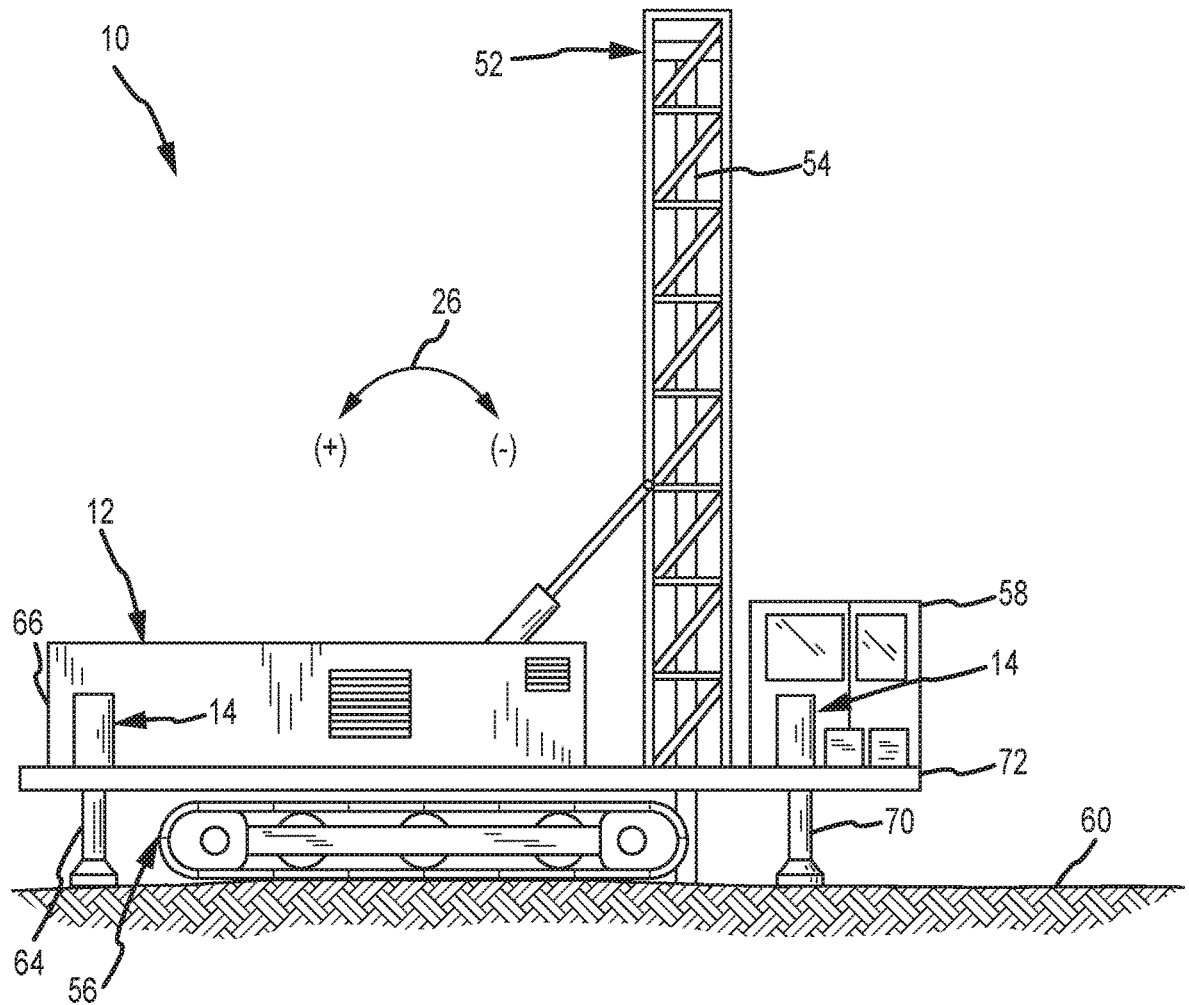
FIG. 1 is a side view in elevation of a drill rig embodying the dynamic jack reference control system of the present invention.
Figure 2:
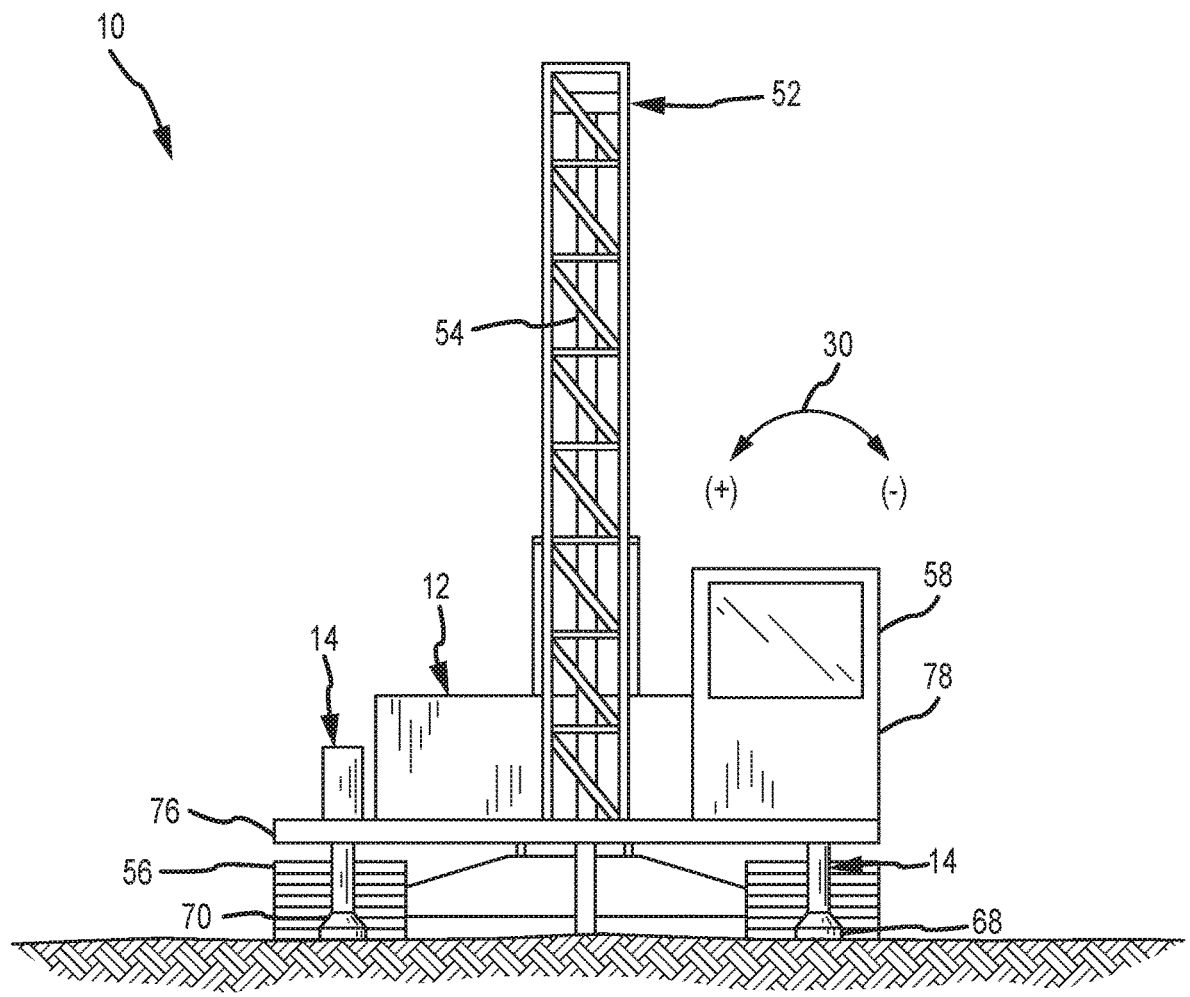
FIG. 2 is a drill end view in elevation of the drill rig illustrated in FIG. 1.
Figure 3:
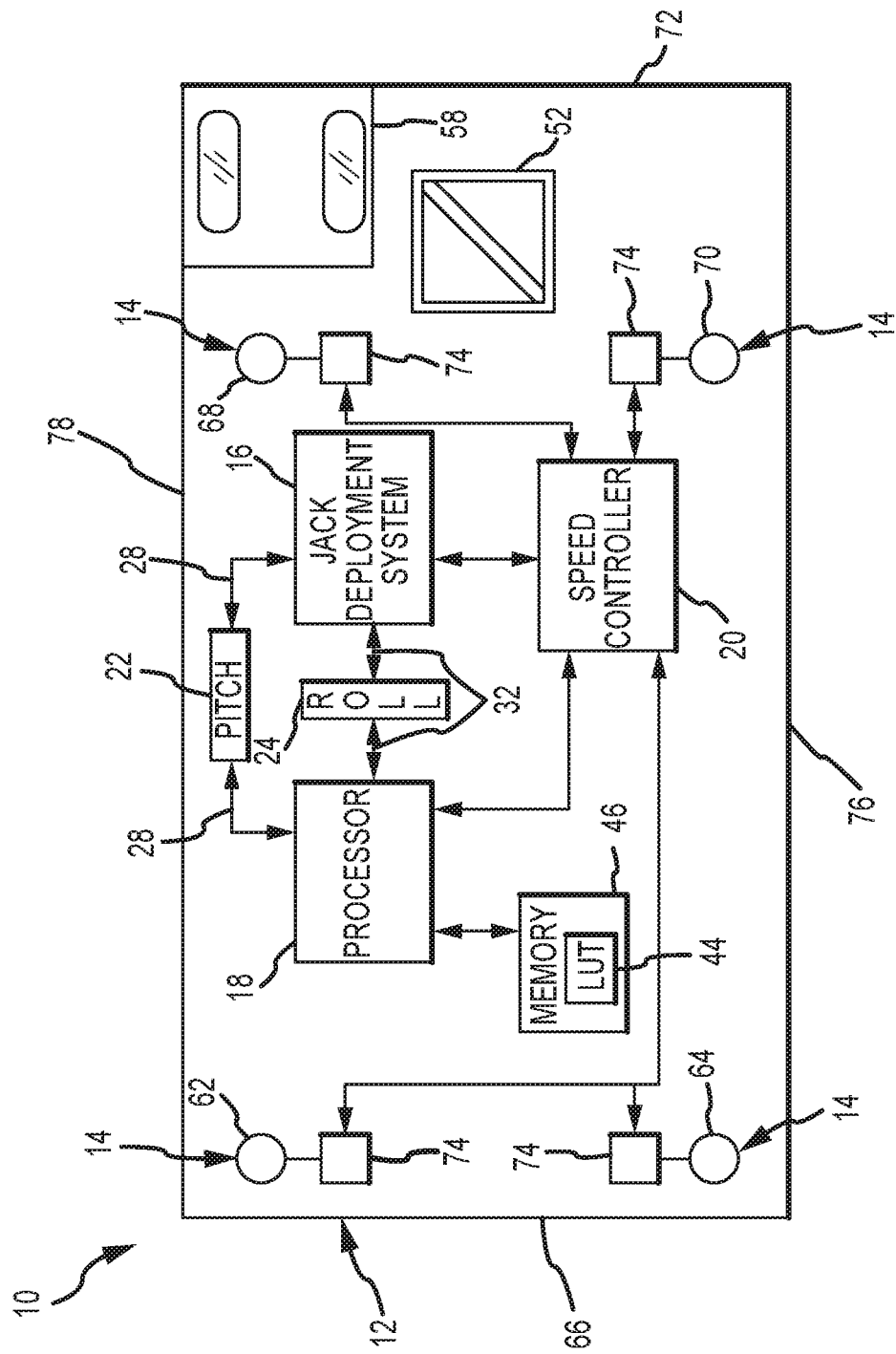
FIG. 3 is a functional block diagram of one embodiment of the dynamic jack reference control system.

Referring now primarily to FIGS. 1-3, drill rig 12 may be provided with a plurality of jacks 14 that may be operated or controlled by a jack deployment system 16. In the embodiment shown and described herein, jack deployment system 16 may comprise an automated or semi-automated jack deployment system that may be operated to extend the various jacks 14 on drill rig 12 until the drill rig 12 has reached the desired set point or attitude, typically a level attitude. The dynamic jack reference control system 10 controls or varies the speeds at which the various jacks 14 are extended or retracted based on the tilt angle of the vehicle. Stated another way, while the jack deployment system 16 extends or retracts the various jacks 14 to achieve the desired vehicle attitude, the dynamic jack reference control system 10 controls the speed at which the various jacks 14 are extended or retracted. The dynamic jack reference control system 10 varies the extension (or retraction) speed of the jacks 14 until the drill rig 12 has achieved the desired attitude.

Referring now primarily to FIG. 3, the dynamic jack reference control system 10 may comprise a processor system 18 that is operatively associated a speed controller 20. Speed controller may also be operatively associated with the jack deployment system 16 and the various jacks 14 so that speed controller 20 can control the speed at which the various jack or jacks 14 are extended or retracted. The system 10 may also comprise at one or more tilt sensors, such as a pitch sensor 22 and a roll sensor 24, that are operatively connected to the processor 18. Pitch sensor 22 senses a pitch attitude or angle 26 (FIG. 1) of drill rig 12 and produces a pitch output signal 28 that is related to the pitch angle 26. Similarly, roll sensor 24 senses a roll attitude or angle 30 (FIG. 2) of drill rig 12 and produces a roll output signal 32 that is related to the roll angle 30. Processor 18 uses the pitch and roll output signals 28 and 32 to determine the speed at which the jacks 14 are to be extended.

In the particular embodiment shown and described herein, the pitch and roll sensors 22 and 24 are also connected to the jack deployment system 16. Jack deployment system 16 uses the pitch and roll output signals 28 and 32 to determine when the drill rig 12 has achieved the desired tilt angle or set point attitude.

Figure 4:
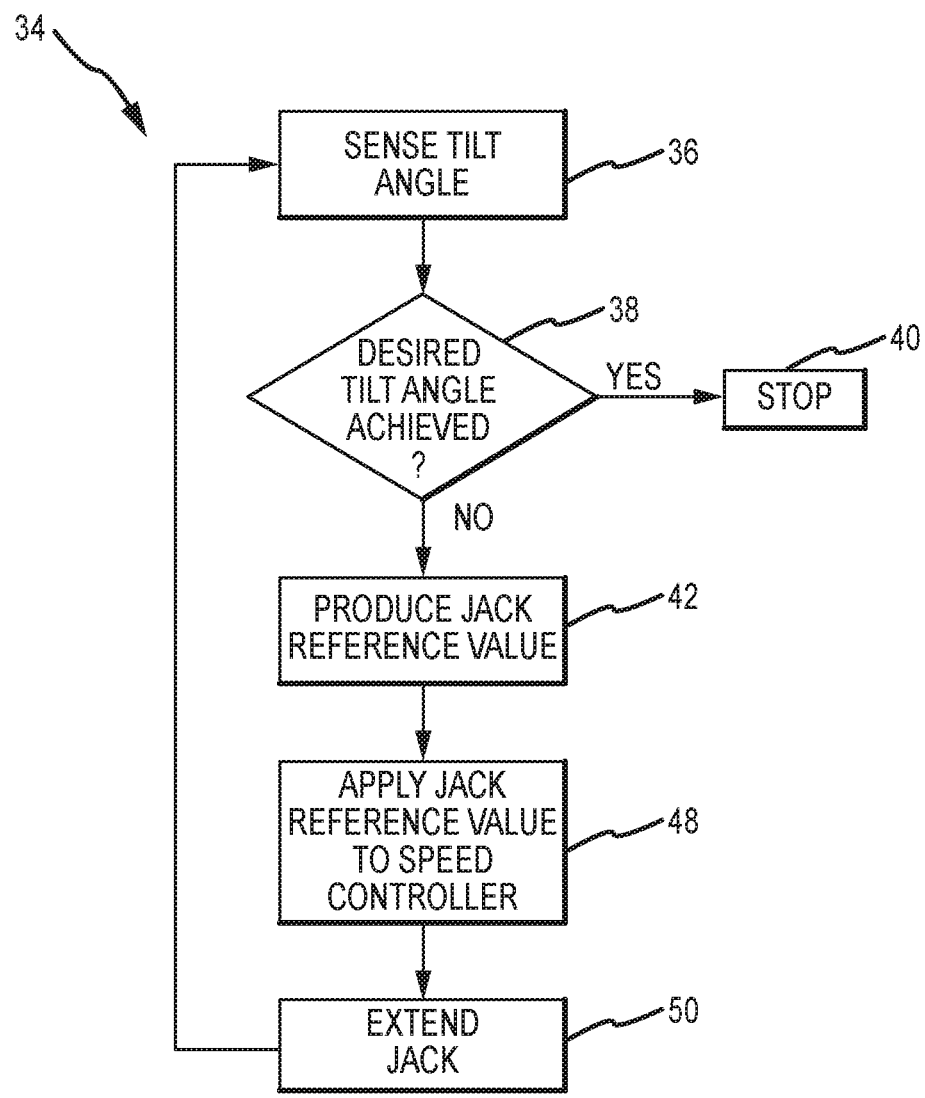
FIG. 4 is a flow chart of a method for dynamically determining a jack reference value according to one embodiment of the present invention.

With reference now primarily to FIG. 4, the dynamic jack reference control system 10 may be programmed or configured to implement a method 34 for extending or retracting the various jacks 14 on the vehicle, e.g., drill rig 12. A first step 36 in method 34 involves sensing the tilt angle (e.g., the pitch angle 26 and/or roll angle 30) of the drill rig 12. At the start of the jack extension process, the tilt angle will be the initial or starting tilt angle of the drill rig 12. Thereafter, as the jacks 14 are extending, the sensed tilt angle will be the instantaneous tilt angle (i.e., the tilt angle of the drill rig 12 at that particular point in time). After sensing the tilt angle, method 34 then proceeds to step 38 to determine whether the desired tilt angle has been achieved. If so, jack extension operation is terminated or stopped at step 40. If not, the method 34 proceeds to step 42 which involves the production of a jack reference value. As used herein, a jack reference value refers to the percentage of the maximum available jack extension (or retraction) speed for the particular jack or jacks 14 involved. For example, a jack reference value of 100% means that the jacks 14 will be allowed to extend at the maximum available rate for the particular jack or jacks 14 being extended. Similarly, a jack reference value of 50% means that the jack or jacks 14 will be allowed to extend at half the maximum available rate for the particular jack or jacks 14 that are being extended.

In the present invention, the jack reference value 42 is based on the sensed tilt angle, or more precisely the difference between the sensed tilt angle and the desired set point value or angle. In one embodiment, the jack reference value produced by step 42 is proportional to the sensed tilt angle. Thus, higher tilt angles (i.e., the difference between the sensed tilt angle and the desired set point value) will result in higher jack reference values, whereas lower tilt angles will result in lower jack reference values.

Figure 6:
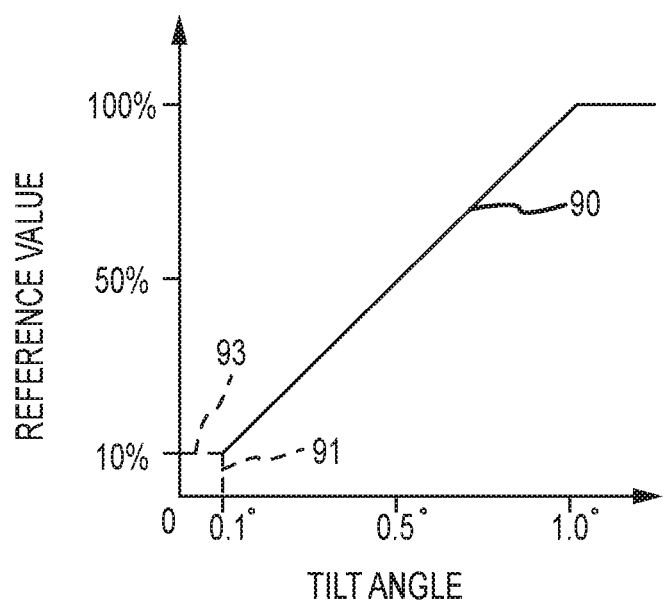
FIG. 6 is a graphical depiction of a jack reference value that is a linear function of sensed tilt angle.
Figure 7:
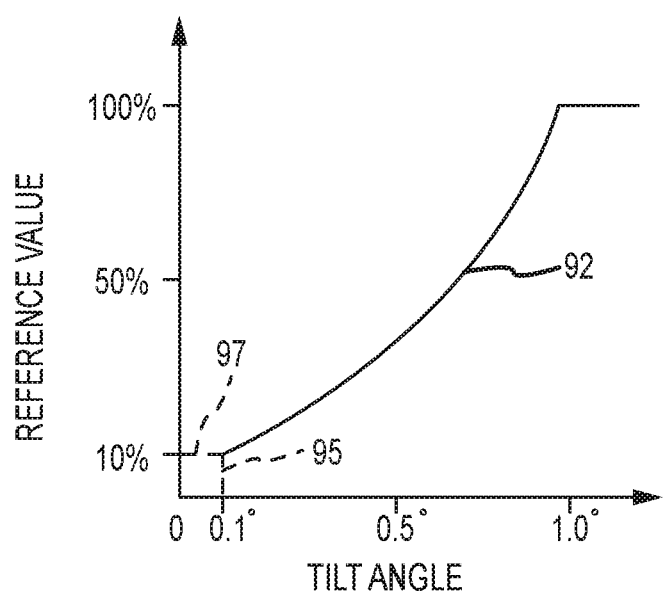
FIG. 7 is a graphical depiction of a jack reference value that is an exponential function of sensed tilt angle.
Figure 8:
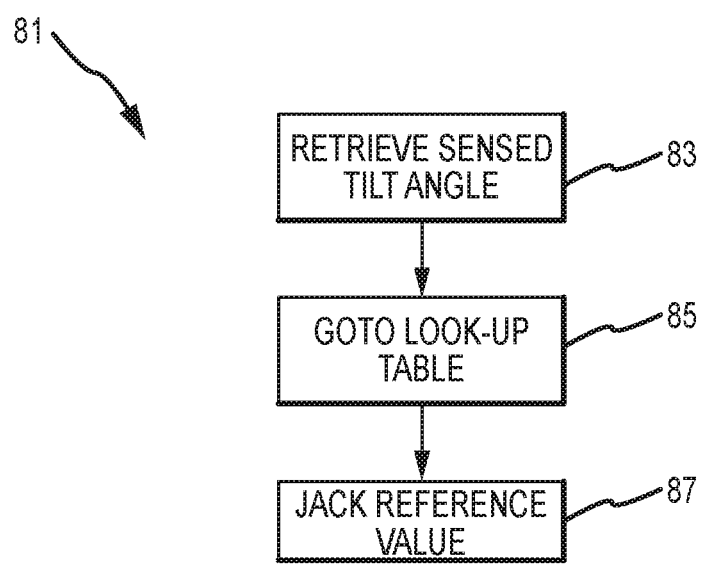
FIG. 8 is a flow chart of another embodiment of a method for producing a jack reference value from a look-up table.
Figure 9:
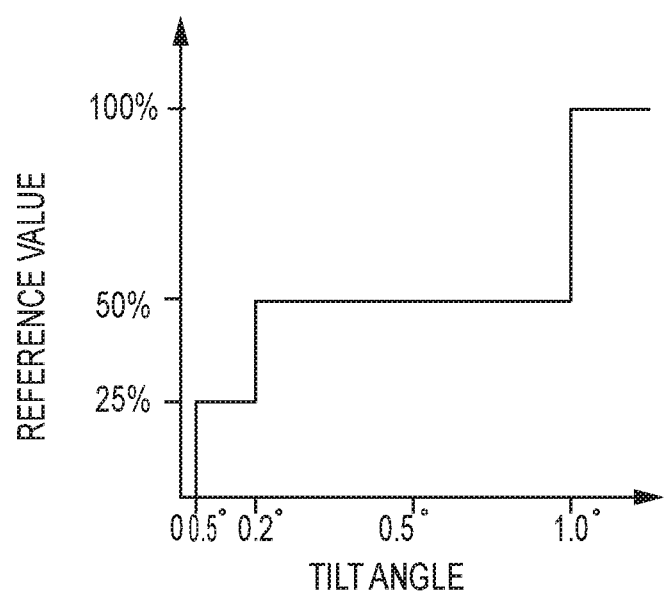
FIG. 9 is a graphical depiction of a relationship between jack reference values and sensed tilt angles defined in one embodiment of a look-up table.

Still further, and depending on the particular embodiment, the jack reference value may be selected to be a certain defined function of the sensed tilt angle. For example, in one embodiment, the jack reference value may be linear function of the sensed tilt angle, as depicted in FIG. 6. In another embodiment, the jack reference value may be an exponential function of the sensed tilt angle, as illustrated in FIG. 7. In still yet another alternative, the jack reference value may be determined or produced by reference to a look-up table (LUT) 44 provided in a memory system 46 associated with processor 18. See FIG. 3. In one embodiment, the look-up table (LUT) 44 may define jack reference value that is a step function of the sensed tilt angle, as depicted in FIG. 9. Alternatively, other functions or relations may be defined by the LUT 44.

Regardless of the particular function or relation that may be utilized to determine the jack reference value from the sensed tilt angle, once the jack reference value has been determined at step 42, method 34 proceeds to step 48 wherein the jack reference value is applied to speed controller 20. Then, at step 50, speed controller 20 uses the jack reference value to adjust or vary the extension speeds of the jacks 14. For example, if the jack reference value produced in step 42 is 100%, then speed controller 20 will allow the jacks 14 to be extended at the maximum available speed.

That is, when commanded by the jack deployment system 16 to extend one or more of the jacks 14, the speed controller 20 will control the extension speed of the particular jack or jacks 14 involved. Similarly, a jack reference value of 50% applied to the speed controller 20 will cause the speed controller 20 (i.e., in response to commands from the jack deployment system 16) to control the extension speed of the jacks 14 to half the maximum available jack extension speed.

The various steps of method 34 will continue to be repeated until the desired tilt angle has been achieved, as determined by step 38. That is, the system 10 will continue to sense the tilt angle (at step 36), produce a jack reference value based on the sensed tilt angle (at step 42), apply the newly produced reference value to the speed controller 20 (at step 48) and extend the jacks 14 (at step 50), until the drill rig 12 has achieved the desired tilt angle or attitude. Thereafter, the jack extension process may be terminated, at step 40.

The system 10 may be operated in accordance with method 34 to control or vary the speed at which the various jacks 14 are extended by the jack deployment system 16 Significantly, and as will be described in much greater detail herein, the speed at which the jacks 14 are extended is related to the sensed tilt angle of the drill rig 14. If the initial sensed tilt angle exceeds the desired tilt angle by a significant amount (for example, if the vehicle is far out of level), the system 10 will produce a jack reference value that will allow the jacks 14 to be extended at the maximum available extension speed. Then, as the sensed tilt angle approaches the desired tilt angle (for example, as the vehicle approaches the desired attitude), the jack reference value produced in step 42 will decrease, with a minimum jack extension speed being used when the sensed tilt angle of the vehicle is close to the desired attitude. The minimum extension speed may continue to be used until the drill rig 12 has reached the desired attitude or tilt angle (or falls within a specified tolerance of the desired tilt angle). At that point, the jack deployment system 16 may terminate the jack extension process.

A significant advantage of the present invention is that it allows the jacks to be extended to achieve a desired vehicle attitude without the problems associated with prior art systems. For example, the rapid jack extension afforded by the present invention when the tilt angle of the vehicle departs significantly from the desired tilt angle allows the vehicle to more rapidly approach the desired attitude. However, when the desired attitude is approached, the reduced jack extension speed significantly reduces the likelihood that the vehicle will overshoot the desired attitude. The system also avoids the problems associated with excessive back and forth motion of the vehicle during the leveling process, which can create excessive stress in vehicle components, and create leveling problems due to soil or ground settling. The system also avoids the need to rapidly cycle or operate the jack actuators as the vehicle approaches the desired attitude. In addition, the present invention also does not suffer from the loss of leveling accuracy typically associated with systems that rely on re-calibration of the sensors. Still yet another advantage of the present invention is that it may be used to control both the extension and retraction speeds of the jacks.

Having briefly described one embodiment of a dynamic jack reference control system 10 as well as a method 34 for extending the vehicle jacks, various embodiments and variations of the systems and methods of the present invention will now be described in detail. However, before proceeding with the detailed description, it should be noted that while the systems and methods are shown and described herein as they could be implemented on a blasthole drill rig 12 of the type commonly used in mining and quarrying operations, they could be used on other vehicle types and in other applications, as would become apparent to persons having ordinary skill in the art after having become familiar with the teachings provided herein.

In addition, while the systems and methods are shown and described herein as they could be used in conjunction with a semi-automatic jack deployment system 16 that is operable to automatically deploy or extend the various jacks 16 until the drill rig has achieved the desired attitude, the systems and methods of the present invention could also be used with other types of jack deployment systems that are now known in the art or that may be developed in the future. Still further, the systems and methods of the present invention are not limited to use with hydraulically operated jack systems, and could be used on any type of jack system, whether hydraulically powered, electrically powered, or some other type of power source. Consequently, the present invention should not be regarded as limited to the particular vehicle types, applications, and environments shown and described herein.

With reference back now to FIGS. 1-3, one embodiment of the dynamic jack reference control system 10 is shown and described herein as it may be used on a blasthole drill rig 12 of the type commonly used in mining and quarrying operations to drill blastholes (not shown). Blasthole drill rig 12 may be comprise a retractable derrick 52 suitable for supporting a drill string 54 suitable for drilling or forming the blastholes. Drill rig 12 may be mounted on a pair of crawler tracks 56 that allow the drill rig 12 to be moved or "trammed" from place-to-place to drill the various blastholes. In an embodiment where the drill rig 12 is to be manned, drill rig 12 may also be provided with an operator cab 58 to allow a drill rig operator (not shown) to monitor and/or operate the various systems and devices of drill rig 12.

Drill rig 12 may also be provided with various other components and systems, such as one or more power plants, electrical systems, hydraulic systems, pneumatic systems, etc. (not shown), that may be required or desired for the operation of the drill rig 12. However, because such other components and systems that may comprise drill rig 12 are well-known in the art, and because a detailed description of such other systems and components is not required to understand or practice the systems and methods of the present invention, the various other components and systems of drill rig 12 that are not directly related to the systems and methods of the present invention will not be described in further detail herein.

Drill rig 12 is also provided with a plurality of jacks 14 that may be used to stabilize and/or lift drill rig 12 to the desired attitude before the drilling operation begins. In the embodiment shown and described herein, the various jacks 14 are hydraulically powered and are controlled by the jack deployment system 16 Jack deployment system 16 is operable to extend the various jacks 14 until they make initial contact with the ground 60. Thereafter, jack deployment system 16 may further extend the various jacks 14 to level the drill rig 12 or otherwise lift it to the desired attitude. Jack deployment system 16 may also retract the jacks 14.

Referring now primarily to FIG. 3, the various jacks 14 of drill rig 12 are arranged in pairs. More specifically, a first pair of jacks 62 and 64 are mounted to a first or "non-drill end" 66 of drill rig 12, whereas a second pair of jacks 68 and 70 are mounted to a second or "drill end" 72 of drill rig 12.

Each of the various jacks 14 may be controlled or operated by a corresponding jack actuator 74. In an embodiment where the jacks 14 comprise hydraulic jacks, the various jack actuators 74 may comprise hydraulic cylinders or "motors" that are used to extend and retract the jacks 14. Alternatively, in an embodiment having electric jacks 14, then the various jack actuators 74 may comprise electric motors that may be operated to extend and retract the jacks 14. Still other arrangements are possible, as would become apparent to persons having ordinary skill in the art after having become familiar with the teachings provided herein. Consequently, the present invention should not be regarded as to any particular type of jacks 14 (e.g., hydraulic or electric), nor to any particular type of jack actuator 74.

In the particular embodiment shown and described herein, the two "non-drill drill end" jacks 62 and 64 are controlled by a single hydraulic valve and operate together, as functionally depicted in FIG. 3. That is, when operated by jack deployment system 16, both non-drill end jacks 62 and 64 will extend or retract together. In contrast, the "drill end" jacks 68 and 70 are independently controlled. That is, the jack deployment system 16 may extend and retract the drill end jacks 68 and 70 independently of one another.

The jack deployment system 16 controls the extension and retraction of the various jacks 14. Because the present invention involves varying the extension or retraction speed of the various jacks 14 depending on the tilt angle of the drill rig 12, the present invention comprises a speed controller 20 to allow the extension speeds of the jacks 14 to be varied in the manner described herein. In such a configuration, then, the jack deployment system 16 is depicted in FIG. 3 as being operatively associated with speed controller 20. Stated another way, the primary operational control of the jacks 14 (e.g., the particular jacks 14 to be operated, as well as whether they are to be extended or retracted) is provided by the jack deployment system 16. The speed controller 20, as operated by processor 18, controls or limits the extension or retraction speed of the jacks 14 being controlled by jack deployment system 16. Further, because the system 10 may operate to control both the jack extension and retraction speeds, the term "extension" as used herein should also be regarded encompassing the term "retraction" depending on the particular context in which the term is being used.

In an embodiment wherein the primary operational control of the jacks 14 is provided by jack deployment system 16 the jack deployment system 16 may also be connected to the pitch sensor 22 and the roll sensor 24 in the manner illustrated in FIG. 3. The jack deployment system 16 uses the respective pitch and roll angles 26 and 30 sensed by the sensors 22 and 24 to determine which of the jacks to operate (e.g., extend) to lift the drill rig 12 to the desired tilt angle or set point attitude.

In accordance with the foregoing considerations, then, the jack deployment system 16 may comprise any of a wide range of systems and devices that are now known in the art or that may be developed in the future that are, or would be, suitable for controlling the various jacks in the manner described herein. Consequently, the present invention should not be regarded as limited to any particular type of jack deployment system 16. However, by way of example, in one embodiment, the jack deployment system 16 may comprise a portion of a computerized drill control system (not shown) that is operatively connected to the various other systems and components associated with drill rig 12, including the hydraulic system that is used to extend and retract the jacks 14.

The processor 18 is used in the present invention to produce or determine the jack reference value. Processor 18 then applies the jack reference value to speed controller 20, which operates to control or vary the extension speeds of the jacks 14 being operated by jack deployment system 16 in the manner already described. Accordingly, processor 18 may comprise a similar type of computer system and may be configured to communicate with jack deployment system 16 provided on drill rig 12 either directly or via the speed control system 20, as may be required or desired for any particular installation. Indeed, and depending on the particular vehicle, the processor 18 may comprise a portion of the computerized control system used to operate the various systems and devices of the vehicle. Alternatively, of course, processor 18 could comprise a separate system.

In any event, i.e., regardless of whether processor 18 comprises an independent system or a portion of an existing computerized vehicle control system, processor 18 is programmed to implement the methods described herein and to interface with the speed controller 20. Processor 18 also may be configured to interface with any other system or device of drill rig 12 as may be required or desired in any particular application, as would become apparent to persons having ordinary skill in the art after having become familiar with the teachings provided herein.

Speed controller 20 may comprise any of a wide range of systems and devices that are now known in the art or that may be developed in the future that are or would be suitable for controlling at least the extension speeds of the jacks 14 in the manner described herein. In an embodiment wherein the jacks 14 are hydraulically operated, speed controller 20 may comprise a variable hydraulic valve system capable of varying the flow rate and/or pressure provided to the various hydraulically operated jack actuators 74. In an embodiment wherein the jacks 14 are electrically operated, speed controller 20 may comprise an electric speed control system suitable for varying the voltage and/or current provided to the various electrically operated jack actuators 74. However, because speed control systems for controlling or varying the speed of various types of hydraulically- and electrically-operated jack systems are well known in the art and could be readily provided by persons having ordinary skill in the art after having become familiar with the teachings provided herein, the particular speed controller 20 that may be used will not be described in further detail herein.

Still referring to FIG. 3, processor 18 may also be operatively connected to the pitch sensor 22 and roll sensor 24. Pitch sensor 22 may be mounted to any convenient location on drill rig 12 so that it senses or detects the pitch angle 26 of drill rig 12. Pitch sensor 22 produces a pitch output signal 28 that is related to the pitch angle 26 of drill rig 12. See FIG. 1. In one embodiment, pitch sensor 22 senses the pitch angle 26 of drill rig 12 relative to horizontal, which is designated a zero pitch angle. Pitch angles 26 toward the non-drill end 66 of drill rig 12 are assigned positive (+) pitch angles, whereas pitch angles toward the drill end 72 of drill rig 12 are assigned negative (−) pitch angles, as designated in FIG. 1. Alternatively, the opposite sign convention could also be used. The pitch output signal 28 may be provided in any convenient units, such as degrees or radians. Alternatively, the pitch output signal 28 could be dimensionless. By way of example, in one embodiment, the pitch output signal 28 is provided to processor 18 in units of degrees.

Pitch sensor 22 may comprise any of a wide variety of pitch sensors that are now known in the art or that may be developed in the future that are, or would be, suitable for the intended application. Consequently, the present invention should not be regarded as limited to any particular pitch sensor. However, by way of example, in one embodiment, pitch sensor 22 comprises a single axis analog tilt sensor, part no. PN72162000-045, available from Measurement Specialties of Hampton, Va. (US) and sold under the trademark "ACCUSTAR® IP-66 Clinometer."

Roll sensor 24 may be mounted to any convenient location on drill rig 12 so that it senses or detects the roll angle 30 of drill rig 12. In a manner similar to the pitch sensor 22, roll sensor 24 produces a roll output signal 32 that is related to the roll angle 30 of drill rig 12 as best seen in FIG. 2. In the embodiment shown and described herein, roll sensor 24 senses the roll angle 30 of drill rig 12 relative to horizontal, which is designated a zero roll angle. Roll angles 30 toward a non-cab side 76 of drill rig 12 are assigned positive (+) roll angles, whereas roll angles toward a cab side 78 of drill rig 12 are assigned negative (−) roll angles, as depicted in FIG. 2. Of course, the opposite sign convention could also be used. As was the case for the pitch output signal 28, the roll output signal 32 may be provided in any convenient units, such as degrees or radians. Alternatively, the roll output signal 32 could be dimensionless. By way of example, in one embodiment, the roll output signal 32 is provided to control system 20 in units of degrees.

Roll sensor 24 may comprise any of a wide variety of pitch sensors that are now known in the art or that may be developed in the future that are, or would be, suitable for the intended application. Consequently, the present invention should not be regarded as limited to any particular roll sensor. However, by way of example, in one embodiment, roll sensor 24 comprises a single axis analog tilt sensor, part no. PN72162000-045, available from Measurement Specialties of Hampton, Va. (US) and sold under the trademark "ACCUSTAR® IP-66 Clinometer."

Finally, processor 18 may also be operatively connected to a memory system 46 for storing various types of data, program steps, and instructions that may be implemented by processor 18. In certain embodiments, memory system 46 may also be used to store a look-up table (LUT) 44.

Before proceeding with the description, it should be noted that, as used herein, the terms "tilt angle," which in one embodiment also includes the "pitch angle" and "roll angle," may have slightly different meanings depending on the particular context. For example, when referring to the data or information provided in the output signals from the sensors, such as the pitch output signal 28 from pitch sensor 22 and roll output signal 32 from roll sensor 24, these terms refer to the actual sensed angle(s) of the vehicle, whether in terms of degrees, radians, or whether the terms are dimensionless. Stated simply, in this context, the terms tilt angle (e.g., specifically pitch angle and roll angle) refer to the data produced by the tilt sensors, e.g., the pitch sensor 22 and/or roll sensor 24, as the case may be.

However, when used in the context of determining the jack reference value, or whether the desired tilt angle has been achieved (e.g., as determined in step 38 of FIG. 4), then these terms refer to the difference between the actual or sensed angle of the vehicle and the desired set point value or attitude that is to be achieved by jack extension. In some cases, the values of these terms will be the same regardless of context. However, in other cases, the values of the terms will differ depending on the context.

For example, in an embodiment wherein the pitch and roll angles are deemed to be zero with respect to the horizontal, and when the desired attitude or set point of the vehicle is to be the level condition (i.e., aligned with the horizontal in both pitch and roll), then the absolute values of the tilt angle (e.g., the pitch angle 26 and roll angle 30) will be the same in both contexts. That is, if the pitch angle is +5 and the desired pitch attitude or set point is the level condition (i.e., 0), then the pitch angle (or tilt angle) in the context of the pitch output signal 28 from pitch sensor 22 will be +5. Similarly, the pitch angle (or tilt angle) when used in the context of determining the jack reference value will also be 5. In contrast, if the desired pitch attitude or set point is not the level condition, or if the zero reference in the pitch angle 26 (illustrated in FIG. 1), is not the horizontal but some other angle, then the value of the pitch angle 26 may differ in the two contexts.

However, because persons having ordinary skill in the art will readily understand that the value of the tilt angles may vary depending on the particular embodiment and context, and for convenience of description, the same terms "tilt angle" and/or "pitch angle" and "roll angle" will be used in both contexts.

Referring now primarily to FIG. 4, the system 10 may implement a method 34, i.e., via processor 18, for controlling the extension speeds of the jacks 14 provided on drill rig 12. A first step 36 of method 34 involves sensing the tilt angle, such as, for example, the pitch angle 26 and roll angle 30 of drill rig 12. In this regard it should be noted that in most applications, the processor 18 will sense both the pitch angle 26 and the roll angle 30, because it will be desired to extend all of the jacks 14, thus affecting both the pitch and roll angles 26 and 30 of the drill rig 12. However, it should be noted that in certain circumstances it may only be necessary to sense the angle that is correlated with the particular jack or jacks 14 that are to be extended. For example, in an embodiment wherein two jacks 14, such as non-drill end jacks 62 and 64, that are positioned on the same end (e.g., the non-drill end 66) of drill rig 12 and are also to be extended together, then it may be possible to configure the system 10 so that processor 18 senses only the pitch angle 26, as the pitch angle 26 is strongly correlated with the extension of that pair of jacks 14. However, this is a limited application and will not generally be undertaken in most situations.

Once processor 18 has sensed the pitch angle 26 and roll angle 30 of drill rig 12 processor 18 may store those angles in memory system 46 for later access and processing, as will be described below. The next step 38 in process 34 may involve a determination of whether the desired tilt angle (e.g., pitch and roll angles 26 and 30, as the case may be) has been achieved. If the desired tilt angle has been achieved, then the jack extension process may be terminated or stopped at step 40. If not, the process 34 continues to step 42.

Depending on the configuration of the particular embodiment, step 38 may be conducted by processor 18 or by the jack deployment system 16. For example, in an embodiment wherein the jack deployment system 16 exercises primary operational control of the jacks 14, step 38 may be performed by jack deployment system 16 which may then terminate the jack extension process. Jack deployment system 16 could then send an appropriate signal to processor 18 so that processor 18 can cease implementing method 34. Alternatively, in another embodiment, process step 38 could be performed by processor 18 which could then provide an appropriate signal to jack deployment system 16 to terminate the jack extension process when the desired tilt angle has been achieved. Still other arrangements are possible, as would become apparent to persons having ordinary skill in the art after having become familiar with the teachings provided herein. Consequently, the present invention should not be regarded as limited to any particular configuration or methodology for determining when the desired tilt angle has been achieved.

Continuing now with the description, the next step 42 in process 34 involves the production of a jack reference value. As already mentioned, in one embodiment, the jack reference value refers to the percentage of the maximum jack extension (or retraction) speed available to the particular jack or jacks that are being extended. Thus, a jack reference value of 100% means that the speed controller 20 will allow the jacks 14 to extend at the maximum available rate for the particular jacks involved. Similarly, a jack reference value of 50% means that the speed controller 20 will limit the extension speed of the particular jack or jacks 14 being extended to one-half of the maximum available jack extension speed.

The jack reference value produced by processor 18 in step 42 is based on the sensed tilt angle. Where two tilt angles are sensed, for example, the pitch angle 26 and the roll angle 30, then processor 18 will produce a pitch jack reference value and a roll jack reference value. As will be described in greater detail below, the pitch jack reference value may be used when extending those jack or jacks 14 that are highly correlated to (i.e., affect) the pitch angle 26 of drill rig 12. Similarly, the roll jack reference value may be used when extending those jack or jacks 14 that primarily affect the roll angle 30 of drill rig 12. See also Table 1. By way of example, in the particular embodiment shown and described herein, the pitch jack reference value will be used when extending the two non-drill end jacks 62 and 64, as they are the primary means of changing the pitch angle of drill rig 12. On the other hand, the roll jack reference value will be used when extending either of the drill end jacks 68 and 70, as they are the primary means for changing the roll angle of drill rig 12.

Once the jack reference value or values (e.g., the pitch jack reference value and the roll jack reference value) have been produced at step 42, method 34 proceeds to step 48 wherein the jack reference value or values are applied to the speed controller 20. Speed controller 20 adjusts or varies the extension speeds of the jacks 14 in accordance with the jack reference value at step 50. For example, if the pitch jack reference value is 100% and the roll jack reference value is 50%, the speed controller 20 will allow the non-drill end jacks 62 and 64 to be extended at the maximum available speed. However, when either of the drill end jacks 68 and 70 are being extended (e.g., under the control of jack deployment system 16), then speed controller 20 will limit the extension speed of the jacks to one-half of the maximum allowable extension speeds.

The processor 18 will continue to repeat the various steps of method 34 until the drill rig 12 has achieved the desired tilt angle, as determined by step 38. That is, the processor 18 will continue to sense the tilt angle, at step 36, produce a jack reference value or values (at step 42, apply the newly-produced jack reference value or values to the speed controller 20, and extend the jacks 14 until drill rig 12 has achieved the desired tilt angle. Thereafter, the jack extension process can be terminated, at step 40.

As already described, the jack reference value or values determined in step 42 are based on the sensed tilt angle, i.e., the sensed pitch angle 26 and the sensed roll angle 30. In one embodiment, the jack reference value produced by step 42 is proportional to the sensed tilt angle, with higher tilt angles resulting in higher jack reference values and lower tilt angles resulting in lower jack reference values. Depending on the particular embodiment, the jack reference value may be selected to be a defined function of the sensed tilt angle. For example, in one embodiment, the jack reference value may be linear function of the sensed angle, as depicted in FIG. 6. In another embodiment, the jack reference value may be an exponential function of the sensed tilt angle, as illustrated in FIG. 7. In still yet another alternative, the jack reference value may be determined by reference to a look-up table (LUT) 44 (FIG. 3). In the example embodiment shown and described herein, the look-up table (LUT) 44 may define jack reference value that is a step function of the sensed tilt angle, as depicted in FIG. 9, although other functions may be defined by the LUT 44. Various methods 80 and 81 that may be used to produce the jack reference values will now be described in detail.

Figure 5:
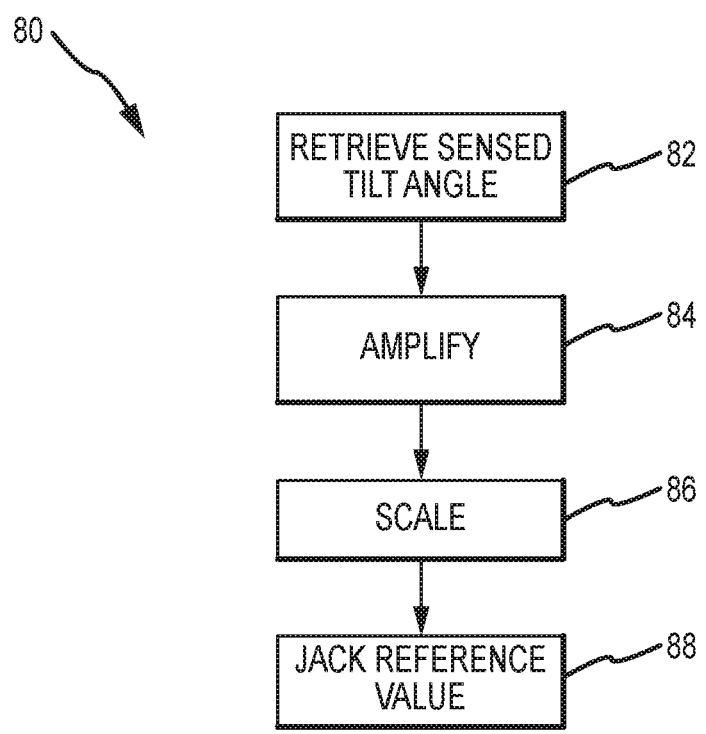
FIG. 5 is a flow chart of one embodiment of a method for producing a jack reference value.

Referring now to FIGS. 5-7, processor 18 may implement method 80 to produce a jack reference value that is a function of the sensed tilt angle. However, before proceeding with the description, it should be noted that, as used herein, the sensed tilt angle may be used to refer to the sensed pitch angle 26, the sensed roll angle 30, taken individually or together as the case may be and depending on the particular jacks that are to be extended. As already described, in most cases, the system 10 will sense both the pitch angle 26 and roll angle 30 as both angles will be needed for the leveling process. However, other embodiments may utilize only one or the other of the pitch and roll angles 26 and 30, depending on the particular circumstances and the jacks that are to be extended. However, in order to streamline the following description, the term "tilt angle" should be regarded as including both the pitch angle 26 and the roll angle 30, taken individually or together.

As also described above, and when used in this context, the term "tilt angle" refers to the difference between the actual tilt angle of the drill rig 12 and the desired tilt angle, as opposed to the actual tilt angle of the vehicle. However, if the desired tilt angle is a level vehicle and in a system wherein the pitch and roll angles 26 and 30 are zero when aligned with the horizontal, then the "tilt angle" used herein would coincide with the actual tilt angle of the drill rig 12 ignoring the sign or polarity (i.e., "+" or "−") of the tilt angle.

A first step 82 in process 80 is to obtain the sensed tilt angle, either by retrieving it from memory system 46 or directly from the pitch and/or roll sensors 22 and 24. Thereafter, the tilt angle may be amplified (at step 84) and scaled (at step 86) before arriving at the jack reference value, at step 88. Depending on the particulars of the amplification and scaling steps 84 and 86, the jack reference value may be made to be any of a wide range of functions of the sensed tilt angle.

In one embodiment, the amplification and scaling functions may be embodied in appropriate software running on processor 18. However, in other embodiments, such amplification and scaling functions may be otherwise embodied, as would become apparent to persons having ordinary skill in the art after having become familiar with the teachings provided herein. Consequently, the present invention should not be regarded as limited to any particular embodiment of the amplification and scaling functions.

For example, and with reference now to FIG. 6, in one embodiment, the jack reference value may be a linear function 90 of the tilt angle. In this particular embodiment, the linear function 90 is such that a tilt angle of 0.1° will result in a jack reference value of about 10%, whereas a tilt angle of at least about 1 will result in a jack reference value of about 100%. Because the jack reference value is a linear function, a tilt angle of about 0.5° will result in a jack reference value of about 50%, as depicted in FIG. 6.

As is also depicted in FIG. 6, tilt angles (i.e., the difference between the sensed tilt angle and the desired or set point tilt angle) in excess of about 1° will continue to result in a jack reference value of about 100%. However, tilt angles of less than about 0.1° may result in a zero reference value, as indicated by broken line 91, depending on the characteristics of the particular system and as described below. Alternatively, linear function 90 could be configured so that the jack reference value remains at 10% even if the tilt angle drops below 0.1°, as indicated by broken line 93.

Whether function 90 follows broken line 91, broken line 93, or some other relation, will depend on the particular characteristics of the jack deployment system 16. For example, in one embodiment, the jack deployment system 16 could be configured to terminate the jack extension process once the tilt angle of the drill rig 12 is within 0.1° of the desired tilt angle. In such a configuration, it would not be necessary to provide a jack reference value for tilt angles between 0° and 0.1° because the jack deployment system 16 would not operate the jacks 14 within that range of tilt angles. However, in another embodiment, the jack deployment system 16 may continue to operate the jacks 14 even though the difference between the actual tilt angle and desired tilt angle falls below 0.1°. In this type of embodiment, then, it may be desirable to configure linear function 90 to follow broken line 93, i.e., to provide a jack reference of 10%. This would allow the jack deployment system 16 to continue to extend the jack 14 when the difference is less than 0.1°.

In another embodiment, the amplification and scaling processes 84 and 86 could be configured so that the jack reference value is an exponential function 92 of the tilt angle. Referring now to FIG. 7, the exponential function 92 is such that a tilt angle of 0.1° will result in a jack reference value of about 10%, whereas a tilt angle of at least about 1° will result in a jack reference value of about 100%. However, because the jack reference value is an exponential function of the tilt angle, a tilt angle of about 0.5° will result in a jack reference value that is only about 33%, as depicted in FIG. 7.

As was the case for the linear function 90, exponential function 92 may be configured so that tilt angles in excess of about 1° will continue to result in a jack reference value of about 100%. Tilt angles of less than about 0.1° may result in a zero reference value, as indicated by broken line 95, or a 10% reference value, as indicated by broken line 97. Whether exponential function 92 follows broken line 95, broken line 97, or some other relation, will depend on the particular characteristics of the jack deployment system 16 as explained above for linear function 90.

In another embodiment the jack reference value may be determined by reference to a look-up table (LUT) 44 provided in memory system 46. In this embodiment, processor 18 may implement method 81 to produce a jack reference value from the LUT 44. In a first step 83 in process 81, processor 18 retrieves or otherwise obtains the sensed tilt angle of the drill rig 12. Processor 18 then accesses the LUT 44 in step 85 and determines the jack reference value that corresponds to the sensed tilt angle at step 87.

Look-up table 44 may define the jack reference value in any of a number of ways. For example, and with reference now to FIG. 9, in one embodiment, the LUT 44 defines a jack reference value that is a step function of the sensed tilt angle. In the particular embodiment depicted in FIG. 9, the LUT 44 specifies a jack reference value of 25% for tilt angles ranging from about 0.05° to about 0.2°. LUT 44 specifies a jack reference value of 50% between tilt angles of about 0.2° to about 1°. Tilt angles greater than about 1° will return jack reference values of 100%. Alternatively, LUT 44 may be programmed or established with alternate values or functions of the jack reference value, as would become apparent to persons having ordinary skill in the art. Consequently, the present invention should not be regarded as limited to look-up tables 44 defining any particular relationship between the jack reference value and tilt angle. As mentioned, the particular jack reference value used to control the jack extension speed may vary depending on the particular jack that is to be extended as well as on the particular tilt angle (e.g., pitch angle 26 or roll angle 30) that is sensed. An example embodiment of a control schedule based on the look-up table jack reference function depicted in FIG. 9 is illustrated in Table I:

TABLE I

| Sensed Tilt Angle (Pitch or Roll) | Jack Reference for Cab-Side Jack 68 | Jack Reference for Non Cab Side Jack 70 | Jack Reference for Non Drill End Jacks 62, 64 |
| --- | --- | --- | --- |
| Roll < −1° | 100% | 0% | 0% |
| −1° < Roll < −0.2° | 50% | 0% | 0% |
| −0.2° < Roll < −0.05° | 25% | 0% | 0% |
| Roll > 1° | 0% | 100% | 0% |
| 0.2° < Roll < 1° | 0% | 50% | 0% |
| 0.05° < Roll < 0.2° | 0% | 25% | 0% |
| Pitch > 1° | 0% | 0% | 100% |
| 0.2° < Pitch < 1° | 0% | 0% | 50% |
| 0.05° < Pitch < 0.2° | 0% | 0% | 25% |
| Pitch < −1° | 100% | 100% | 0% |
| −1° < Pitch < −0.2° | 50% | 50% | 0% |
| −0.2° < Pitch < −0.05° | 25% | 25% | 0% |

The dynamic jack reference control system 10 may be utilized as follows to extend the various jacks 14 to level the drill rig 12 or otherwise raise it to the desired attitude. Assuming that the various jacks 14 have been extended to the point where they have made firm ground contact, the jack deployment system may be activated to extend the various jacks 14 until the drill rig has achieved the desired set point. In this example, the desired set point will be a level condition, although other attitudes may also be desired. In addition, the jack deployment system will already be configured or programmed to extend the various jacks in accordance with the control schedule and jack reference values set forth in Table I. In this example, the jack deployment system 16 is operatively associated with the pitch and roll sensors 22 and 24 and will have already determined the initial attitude of drill rig 12. In addition, however, processor 18 will also be activated to determine the various jack reference values to be applied to speed controller 20.

If the initial tilt angles (e.g., either the pitch angle 26 or roll angle 30) exceed about 1°, the processor 18 produces jack reference values of 100%. These jack reference values are applied to the particular jack 14 or jacks 14 to be extended to achieve the level condition. For example, and with reference to FIG. 1 and Table I, if the drill rig 12 is initially pitched toward the non-drill end 66 by more than about 1° (i.e., a pitch angle greater than about +1), then the system 10 will apply a 100% jack reference to both non-drill end jacks 62 and 64 as they are being extended. This jack reference of 100% will continue to be applied until the pitch angle decreases to less than about 1°, at which point the system 10 will reduce the jack reference to 50% in this example. The 50% jack reference value will be applied until the pitch angle decreases to less than about 0.2°, at which point the system 10 will further reduce the jack reference to 25%. This jack reference of 25% will continue to be applied until the pitch angle decreases below about 0.05 or until the system determines that the desired pitch angle has been achieved (i.e., in step 38 of FIG. 4). By way of example, in this particular embodiment, the jack extension process will be terminated when the sensed pitch angle falls below about 0.1°, at which point the drill rig 12 is substantially level with respect to pitch.

Similar control schedules may be applied to the other jacks (i.e., the drill end jacks 68 and 70) to achieve the desired roll angle or set point and/or to correct negative pitch angles (i.e., when the drill rig 12 is pitched toward the drill end 72). For example, if the drill rig 12 is pitched toward the drill end 72, i.e., at a negative (−) pitch angle, both drill end jacks 68 and 70 may be extended together to raise or elevate the drill end 72, thus leveling the drill rig 12 with respect to pitch. In addition, either one of the drill end jacks 68 or 70 may be extended as required to level the drill rig 12 with respect to roll, or to otherwise achieve a desired roll angle.

For example, if the drill rig 12 is initially tilted toward the non-cab side 76 (FIG. 2), i.e., if the drill rig 12 exhibits a positive (+) roll angle 30, then the system will extend the non-cab side jack 70 until the sensed roll angle falls below about 0.1° in this example. As the non-cab side jack 70 is being extended, the system 10 will apply the various reference values listed in Table 1. That is, the system will apply a jack reference value of 100% to the jack 70 if the roll angle exceeds about +1°. The system will decrease the jack reference value to 50% when the roll angle 30 falls below about 1° and will further decrease the jack reference value to 25% when the roll angle falls below about 0.2°. In this example embodiment, the system will terminate extension of the non-cab side jack 70 when the sensed roll angle falls below about 0.1°. Alternatively, of course, a similar control schedule may be applied to the cab side jack 68 to correct negative roll angles 30.

Having herein set forth preferred embodiments of the present invention, it is anticipated that suitable modifications can be made thereto which will nonetheless remain within the scope of the invention. The invention shall therefore only be construed in accordance with the following claims:

What is claimed is:

1. A method for leveling a jacked vehicle, comprising:
   (a) using a pitch sensor, sensing a pitch angle of the vehicle;
   (b) using a roll sensor, sensing a roll angle of the vehicle; and
   (c) using a processor operatively associated with the pitch sensor and the roll sensor and a speed controller, the processor being equipped with a computer-readable medium that when executed causes the processor to:
      produce a pitch jack reference value that is related to the sensed pitch angle of the vehicle, the pitch jack reference value being a percentage of a maximum jack extension speed available for a vehicle jack that affects at least the pitch angle of the vehicle;
      produce a roll jack reference value that is related to the sensed roll angle of the vehicle, the roll jack reference value being a percentage of a maximum jack extension speed available for a vehicle jack that affects at least the roll angle of the vehicle;
      apply the pitch jack reference value to the speed controller to extend the vehicle jack that affects at least the pitch angle of the vehicle at a speed that is related to the pitch jack reference value;
      apply the roll jack reference to the speed controller to extend the vehicle jack that affects at least the roll angle of the vehicle at a speed that is related to the roll reference value; and
      repeat (a)-(c) until the sum of the pitch and roll angles falls below a predetermined angle.

2. The method of claim 1, wherein the pitch jack reference value comprises a linear function of the sensed pitch angle, and the roll jack reference comprises a linear function of the sensed roll angle.

3. The method of claim 2, wherein the pitch jack reference value comprising a linear function of the sensed pitch angle comprises a pitch jack reference value that varies substantially linearly from a pitch jack reference value of about 10% when the sensed pitch angle is about 0.1° to a pitch jack reference value of about 100% when the sensed pitch angle is about 1°, and wherein the roll jack reference value comprising a linear function of the sensed roll angle comprises a roll jack reference value that varies substantially linearly from a roll jack reference value of about 10% when the sensed roll angle is about 0.1° to a roll jack reference value of about 100% when the sensed roll angle is about 1°.

4. The method of claim 1, wherein causing the processor to produce a pitch jack reference value related to the sensed pitch angle comprises causing the processor to use a look-up table to determine a pitch jack reference value that corresponds to the sensed pitch angle, and wherein causing the processor to produce a roll jack reference value that is related to the sensed roll angle comprises causing the processor to use the look-up table to determine a roll jack reference value that corresponds to the sensed roll angle.

5. The method of claim 4, wherein causing the processor to use a look-up table to determine the pitch jack reference value that corresponds to the sensed pitch angle comprises causing the processor to select from the look-up table:
   a pitch jack reference value of about 25% when the sensed pitch angle is in a range from about 0.05° to about 0.2°;
   a pitch jack reference value of about 50% when the sensed pitch angle is in a range from about 0.2° to about 1°; and
   a pitch jack reference value of about 100% when the sensed pitch angle exceeds about 1°.

6. The method of claim 4, wherein causing the processor to use a look-up table to determine the roll jack reference value that corresponds to the sensed roll angle comprises causing the processor to select from the look-up table:
   a roll jack reference value of about 25% when the sensed roll angle is in a range from about 0.05° to about 0.2°;
   a roll jack reference value of about 50% when the sensed roll angle is in a range from about 0.2° to about 1°; and
   a roll jack reference value of about 100% when the sensed roll angle exceeds about 1°.

7. A method for leveling a jacked vehicle having at least one jack, comprising:
   using a tilt sensor, sensing a tilt angle of the vehicle; and
   using a processor operatively associated with the tilt sensor and a speed controller, the processor being equipped with a computer-readable medium that when executed causes the processor to:
      evaluate the sensed tilt angle against a desired tilt angle of the vehicle to determine if the desired tilt angle has been achieved,
      produce a jack reference value using a difference between the sensed tilt angle and the desired tilt angle, if the desired tilt angle has not been achieved,
      apply the jack reference value to a speed controller, and cause the speed controller to extend the at least one jack at a speed relative to the jack reference value, the jack reference value being a percentage of maximum jack extension speed available for the at least one jack.

8. The method of claim 7, wherein using a processor comprises causing the processor to:
   amplify and scale the sensed tilt angle to produce an amplified and scaled tilt angle;
   evaluate the amplified and scaled tilt angle against a desired tilt angle of the vehicle to determine if the desired tilt angle has been achieved; and
   produce a jack reference value using a difference between the amplified and scaled tilt angle and the desired tilt angle, if the desired tilt angle has not been achieved.

9. The method of claim 7, wherein producing a jack reference value comprises producing a jack reference value that is proportional to the sensed tilt angle.

10. The method of claim 9, wherein producing a jack reference value that is proportional to the sensed tilt angle comprises using a look-up table to determine a jack reference value that corresponds to the sensed tilt angle, and further comprising using a memory system operatively associated with the processor to store the look-up table.

11. The method of claim 10, wherein using a look-up table to determine a jack reference value that correspond to the senses tilt angle comprises:
   selecting a jack reference value of about 25% when the sensed tilt angle is in a range of from about 0.05° to about 02°;
   selecting a jack reference value of about 50% when the sensed tilt angle is in a range of from about 0.2° to about 1°; and
   selecting a jack reference value of about 100% when the sensed tilt angle exceeds about 1°.

12. A method for extending and retracting at least a first jack and a second jack on a vehicle having a jack deployment system for deploying the first jack and the second jack and a speed controller operatively associated with the jack deployment system and the first and second jack, comprising:
   using a tilt sensor connected to the jack deployment system, sensing a first tilt angle of the vehicle for the first jack and a second tilt angle for the second jack;
   using a processor operatively associated with the tilt sensor and the speed controller, the processor being equipped with a computer-readable medium that when executed causes the processor to:
      produce a first jack reference value using the first sensed tilt angle and produce a second jack reference value using the second sensed tilt angle, the first jack reference value being a percentage of maximum jack extension and retraction speed available for the first jack and the second jack reference value being a percentage of maximum jack extension and retraction speed available for the second jack,
      apply the first jack reference value and the second jack reference value to the speed controller, and
      cause the jack deployment system to deploy the first jack and the second jack while causing the speed controller to control a first speed of jack extension and retraction for the first jack relative to the first jack reference value and control a second speed of jack extension and retraction for the second jack relative to the second jack reference value.

13. The method of claim 12, wherein the first jack reference value and the second jack reference value are different percentage values.

14. The method of claim 12, wherein using a processor comprises using a processor operatively associated with the tilt sensor and the speed controller, the processor being equipped with a computer-readable medium that when executed causes the processor to:
   amplify the first and second sensed tilt angles to produce first and second amplified tilt angles; and
   scale the first and second amplified tilt angles to produce the first and second jack reference values.

15. The method of claim 12, wherein using a processor comprises using a processor operatively associated with the tilt sensor, speed controller and jack deployment system, the processor being equipped with a computer-readable medium that when executed causes the processor to cause the jack deployment system to deploy the first jack and the second jack.

* * * * *